UNITED STATES PATENT OFFICE.

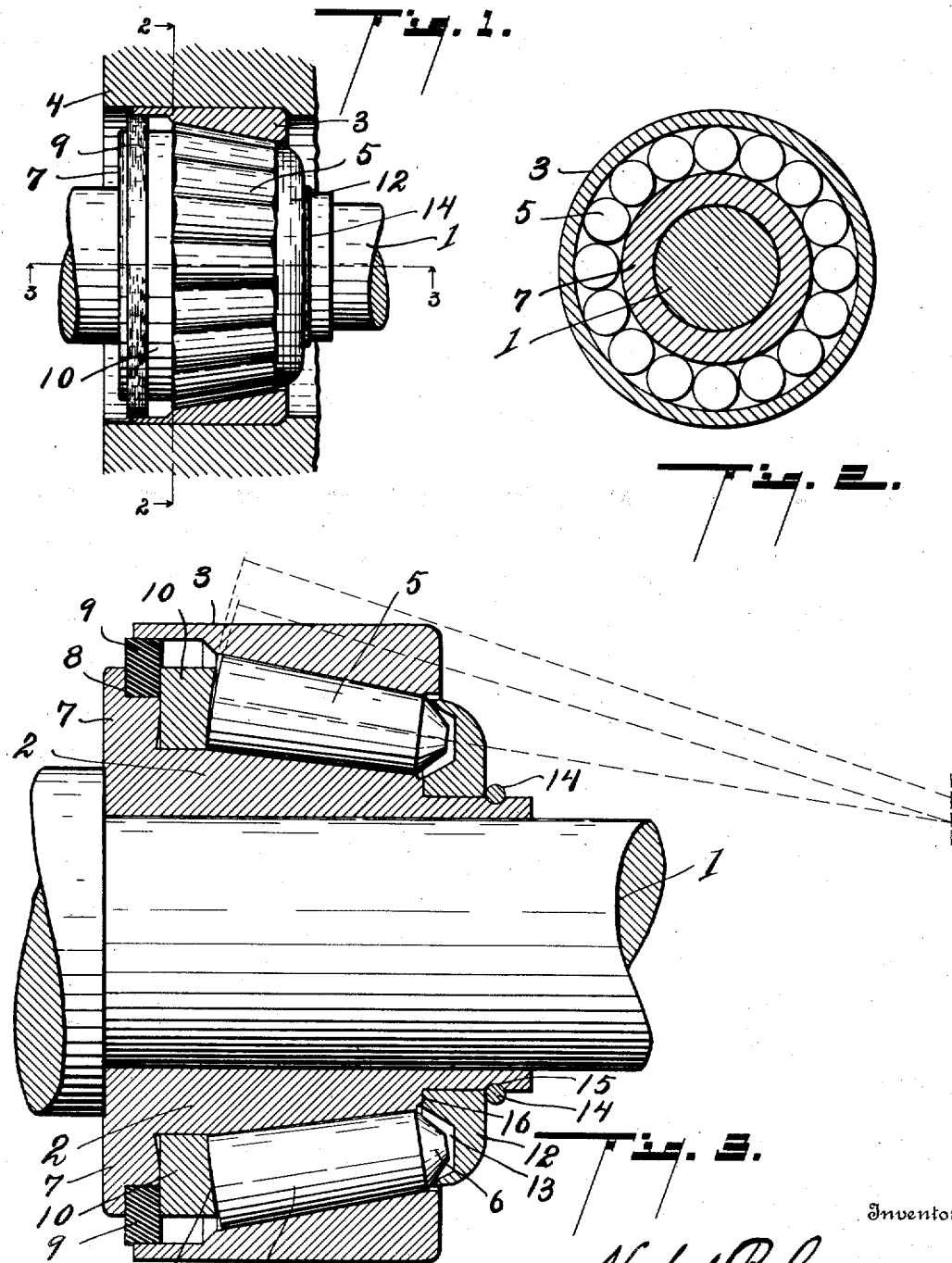

HERBERT B. GILLETTE, OF GRAND RAPIDS, MICHIGAN.

ROLLER-BEARING.

986,453. Specification of Letters Patent. Patented Mar. 14, 1911.

Application filed October 21, 1909. Serial No. 523,879.

*To all whom it may concern:*

Be it known that I, HERBERT B. GILLETTE, a citizen of the United States, residing at the city of Grand Rapids, county of Kent, State of Michigan, have invented certain new and useful Improvements in Roller-Bearings, of which the following is a specification.

This invention relates to improvements in roller bearings.

My present invention relates particularly to improvements in the roller bearing of the class shown in the U. S. Letters Patent No. 892,416, dated July 7, 1908, to the applicant and Charles W. Dake, and is a modification, and in some respects an improvement upon the structure there illustrated and described.

The main objects of this invention are: First, to provide an improved roller bearing in which the bearing rollers are retained without the use of cages or journal pins for the rollers. Second, to provide an improved roller bearing in which the parts are simple and economical in structure and easily assembled or disassembled. Third, to provide an improved roller bearing which is so constructed and arranged that the wear and friction on the parts is minimized.

Further objects, and objects relating to structural details will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

A structure constituting an effective and preferred embodiment of the features of my invention is clearly illustrated in the accompanying drawing, forming a part of this specification, in which:

Figure 1 is a detail side elevation of one of my improved bearings, the hub and the outer bearing member being shown in longitudinal sections, the other parts being shown in full lines. Fig. 2 is a transverse section taken on a line corresponding to line 2—2 of Fig. 1, the hub being omitted. Fig. 3 is an enlarged detail longitudinal section taken on a line corresponding to line 3—3 of Fig. 1, the hub being omitted, the axle and the bearing rollers being shown in full lines.

In the drawing, similar reference characters refer to similar parts throughout the several views, and the sectional views are taken looking in the direction of the little arrows at the ends of the section lines.

Referring to the drawing, 1 represents a shaft or an axle such as the axle of a vehicle. The inner bearing member 2 is adapted to receive the axle. The outer bearing member 3 is arranged in the hub as 4 of the vehicle wheel or pulley. These bearing members are preferably conical as illustrated. The bearings are ordinarily arranged in pairs, the other bearing, being a substantial duplicate of the bearing illustrated, as their arrangement will be obvious to those skilled in the art to which this invention relates.

The bearing rollers 5 are preferably conical as shown, the sides being of uniform taper from end to end, the small ends 6 being conical and their large ends being convexed. The inner bearing member 2 is provided with an outwardly-projecting thrust flange 7 at its large end. This flange is preferably shouldered to form an annular seat 8 for the dust excluding ring 9. A ring-like thrust bearing member 10 is preferably provided for the large ends of the rollers. This thrust bearing member is sleeved upon the inner bearing member 2 to rest against the flange 7. The bearing face 11 of the thrust ring or thrust bearing member 10 is preferably curved in cross section, the curvature of the thrust ring being somewhat less than that of the convexed ends of the rollers. This is indicated by the dotted lines in Fig. 3.

The rollers are retained in place when the outer bearing member is removed by the retaining ring 12, which is sleeved upon the inner bearing member and provided with an annular groove 13 in its inner face into which the conical ends of the rollers project. The thrust bearing member is preferably inclined toward the rollers as illustrated, and is of such width that it coacts with the retaining ring in retaining the rollers upon the inner bearing members when the outer bearing members are removed. The retaining ring 13 is locked in position by means of the locking ring 14, the inner bearing member being provided with a groove 15 to receive the same. The inner bearing member is shouldered at 16 to form a seat for the retaining ring 12. This provides an effective means for detachably securing the parts together so that they can be readily assembled or disassembled as occasion may require. The retaining ring is so arranged that its outer edge engages the conical ends of the rollers, but, as previously stated, the parts are normally out of contact.

By thus arranging the parts the necessity for cages or journals for the rollers is obviated, as the rollers are entirely free to travel about the bearing and impinge with each other and with the cones throughout the entire length of the rollers. Further, the thrust ring or bearing member 10 and the retaining ring are both loosely secured to the inner bearing cone so that should the rollers, for any reason become out of alinement, they are readily brought into alinement by the shifting of the rings. Another very great advantage is that when the outer boxing or cone is removed, the rollers can be very easily shifted about to permit a thorough cleaning of the cone and the rollers if desired, without the removing of the rollers, however, the structure is so very readily assembled or disassembled that the rollers can be released merely by the slipping off of the retaining ring.

My improved bearing is very economical in structure and is, at the same time, a very superior structure. As the load is distributed throughout the rollers the wear on the parts is reduced to a minimum. The thrust ring being provided with a curved bearing surface and the ends of the rollers being convexed, the parts are not likely to cut out and the wear is minimized.

I have illustrated my improvements in the form in which I have embodied the same and I find this form to be highly satisfactory. I am, however, aware that the structural details may be considerably varied without departing from my invention.

Having thus described my invention, what I claim as new and desire to secure by Letters Patent is:

1. In a bearing, the combination with an inner bearing cone provided with an outwardly-projecting flange at its large end, said flange being shouldered on its inner side to provide an annular dust ring seat; an outer bearing cone; a dust ring arranged in said seat, said dust ring being adapted to fit said outer bearing cone; conical rollers, the sides of said rollers being of uniform taper from end to end, the large ends convexed and the small ends conical; a thrust ring for the large ends of said rollers sleeved upon said inner bearing cone against the said flange thereon, the bearing face of said thrust ring being curved in cross section and inclined toward said rollers, the curvature of said face being less than that of the ends of said rollers, said thrust ring being adapted to retain said dust ring on its said seat; a retaining ring for said rollers sleeved upon said inner cone, said retaining ring having an annular groove therein into which the conical ends of said rollers project, said rollers being normally out of contact with said retaining ring, said thrust ring being of sufficient width to coact with said retaining ring in loosely securing said rollers to said inner cone when the outer cone is removed; and a locking ring for said retaining ring, said inner cone being provided with a groove to receive said locking ring.

2. In a bearing, the combination with an inner bearing cone provided with an outwardly-projecting flange at its large end; an outer bearing cone; conical rollers, the sides of said rollers being of uniform taper from end to end, the large ends convexed and the small ends conical; a thrust ring for the large ends of said rollers sleeved upon said inner bearing cone against the said flange thereon, the bearing face of said thrust ring being curved in cross section and inclined toward said rollers, the curvature of said face being less than that of the ends of said rollers; a retaining ring for said rollers sleeved upon said inner cone, said retaining ring having an annular groove therein into which the conical ends of said rollers project, said rollers being normally out of contact with said retaining ring, said thrust ring being of sufficient width to coact with said retaining ring in loosely securing said rollers to said inner cone when the outer cone is removed; and a locking ring for said retaining ring, said inner cone being provided with a groove to receive said locking ring.

3. In a bearing, the combination with an inner bearing cone provided with an outwardly-projecting flange at its large end, said flange being shouldered on its inner side to provide an annular dust ring seat; an outer bearing cone; a dust ring arranged in said seat, said dust ring being adapted to fit said outer bearing cone; conical rollers, the sides of said rollers being of uniform taper from end to end, the large ends convexed and the small ends conical; a thrust ring for the large ends of said rollers sleeved upon said inner bearing cone against the said flange thereon, the bearing face of said thrust ring being curved in cross section and inclined toward said rollers, the curvature of said face being less than that of the ends of said rollers, said thrust ring being adapted to retain said dust ring on its said seat; and a retaining ring for said rollers sleeved upon said inner cone, said retaining ring having an annular groove therein into which the conical ends of said rollers project, said rollers being normally out of contact with said retaining ring, said thrust ring being of sufficient width to coact with said retaining ring in loosely securing said rollers to said inner cone when the outer cone is removed.

4. In a bearing, the combination with an inner bearing cone provided with an outwardly-projecting flange at its large end; an outer bearing cone; conical rollers, the sides of said rollers being of uniform taper from end to end, the large ends convexed and the small ends conical; a thrust ring for the large ends of said rollers sleeved upon said inner bearing cone against the said flange thereon, the bearing face of said thrust ring being curved in cross section and inclined toward said rollers, the curvature of said face being less than that of the ends of said rollers; and a retaining ring for said rollers sleeved upon said inner cone, said retaining ring having an annular groove therein into which the conical ends of said rollers project, said rollers being normally out of contact with said retaining ring, said thrust ring being of sufficient width to coact with said retaining ring in loosely securing said rollers to said inner cone when the outer cone is removed.

5. In a bearing, the combination with an inner bearing member provided with an outwardly-projecting flange at its large end, said flange being shouldered on its inner side to provide an annular dust ring seat; an outer bearing member; a dust ring arranged in said seat, said dust ring being adapted to fit said outer bearing member; rollers, said rollers being convexed at one end and conical at the other; a thrust ring for the convexed ends of said rollers sleeved upon said inner bearing cone against the said flange thereon, said thrust ring being adapted to retain said dust ring on its said seat; a retaining ring for said rollers sleeved upon said inner cone, said retaining ring having an annular groove therein into which the conical ends of said rollers project, said rollers being normally out of contact with said retaining ring, said thrust ring being of sufficient width to coact with said retaining ring in loosely securing said rollers to said inner cone when the outer cone is removed; and a locking ring for said retaining ring, said inner bearing member being provided with a groove to receive said locking ring.

6. In a bearing, the combination with an inner bearing member provided with an outwardly-projecting flange at its large end; an outer bearing member; rollers, said rollers being convexed at one end and conical at the other; a thrust ring for the convexed ends of said rollers sleeved upon said inner bearing cone against the said flange thereon; a retaining ring for said rollers sleeved upon said inner cone, said retaining ring having an annular groove therein into which the conical ends of said rollers project, said rollers being normally out of contact with said retaining ring, said thrust ring being of sufficient width to coact with said retaining ring in loosely securing said rollers to said inner cone when the outer cone is removed; and a locking ring for said retaining ring, said inner bearing member being provided with a groove to receive said locking ring.

7. In a bearing, the combination with an inner bearing member provided with an outwardly-projecting flange at its large end, said flange being shouldered on its inner side to provide an annular dust ring seat; an outer bearing member; a dust ring arranged in said seat, said dust ring being adapted to fit said outer bearing member; rollers, said rollers being convexed at one end and conical at the other; a thrust ring for the convexed ends of said rollers sleeved upon said inner bearing cone against the said flange thereon, said thrust ring being adapted to retain said dust ring on its said seat; and a retaining ring for said rollers sleeved upon said inner cone, said retaining ring having an annular groove therein into which the conical ends of said rollers project, said rollers being normally out of contact with said retaining ring, said thrust ring being of sufficient width to coact with said retaining ring in loosely securing said rollers to said inner cone when the outer cone is removed.

8. In a bearing, the combination with an inner bearing member provided with an outwardly-projecting flange at its large end; an outer bearing member; rollers, said rollers being convexed at one end and conical at the other; a thrust ring for the convexed ends of said rollers sleeved upon said inner bearing cone against the said flange thereon; and a retaining ring for said rollers sleeved upon said inner cone, said retaining ring having an annular groove therein into which the conical ends of said rollers project, said rollers being normally out of contact with said retaining ring, said thrust ring being of sufficient width to coact with said retaining ring in loosely securing said rollers to said inner cone when the outer cone is removed.

9. In a bearing, the combination with an inner bearing cone; an outer bearing cone; conical rollers, the sides of said rollers being of uniform taper from end to end, the large ends convexed and the small ends conical; a thrust bearing ring on said inner bearing cone for the large ends of said rollers, the bearing face of said thrust bearing ring being curved in cross section, the curvature of said thrust bearing ring face being less than that of the ends of said rollers; a retaining ring for said rollers sleeved upon said inner cone, said retaining ring having an annular groove therein into which the conical ends of said rollers project, said rollers being normally out of contact with said retaining ring, said thrust bearing ring being of sufficient width to coact with said retaining ring in loosely securing said rollers to said inner cone when the outer cone is removed; and a locking means for said retaining ring, said inner cone being provided with a groove to receive said locking ring.

10. In a bearing, the combination with an inner bearing cone; an outer bearing cone; conical rollers, the sides of said rollers being of uniform taper from end to end, the large ends convexed and the small ends conical; a thrust bearing ring on said inner bearing cone for the large ends of said rollers, the bearing face of said thrust bearing ring being curved in cross section, the curvature of said thrust bearing ring being less than that of the ends of said rollers; and a retaining ring for said rollers sleeved upon said inner cone, said retaining ring having an annular groove therein into which the conical ends of said rollers project, said rollers being normally out of contact with said retaining ring, said thrust bearing ring being of sufficient width to coact with said retaining ring in loosely securing said rollers to said inner cone when the outer cone is removed.

11. In a bearing, the combination with an inner bearing cone; an outer bearing cone; conical rollers, the sides of said rollers being of uniform taper from end to end and the large ends convexed; a thrust bearing ring on said inner bearing cone for the large ends of said rollers, the bearing face of said thrust bearing ring being curved in cross section, the curvature of said thrust bearing ring face being less than that of the ends of said rollers; a retaining ring for said rollers sleeved upon said inner cone, said retaining ring having an annular groove therein into which the small ends of said rollers project, said rollers being normally out of contact with said retaining ring, said thrust bearing ring being of sufficient width to coact with said retaining ring in loosely securing said rollers to said inner cone when the outer cone is removed; and a locking ring for said retaining ring, said inner cone being provided with a groove to receive said locking ring.

12. In a bearing, the combination with an inner bearing cone; an outer bearing cone; conical rollers, the sides of said rollers being of uniform taper from end to end and the large ends convexed; a thrust bearing ring on said inner bearing cone for the large ends of said rollers; the bearing face of said thrust bearing ring being curved in cross section, the curvature of said thrust bearing ring face being less than that of the ends of said rollers; and a retaining ring for said rollers sleeved upon said inner cone, said retaining ring having an annular groove therein into which the small ends of said rollers project, said rollers being normally out of contact with said retaining ring, said thrust bearing ring being of sufficient width to coact with said retaining ring in loosely securing said rollers to said inner cone when the outer cone is removed.

13. In a bearing, the combination with an inner bearing member; an outer bearing member; rollers, said rollers being convexed at one end and conical at the other; a thrust bearing ring on said inner bearing member for the convexed ends of said rollers; and a retaining ring into which the conical ends of said rollers project, said rollers being normally out of contact with said retaining ring, said thrust bearing ring being of sufficient width to coact with said retaining ring in loosely securing said rollers to said inner bearing member when the outer bearing member is removed, the outer edge of said retaining ring being adapted to engage the conical ends of said rollers to retain them.

14. In a bearing, the combination with an inner bearing member; an outer bearing member; conical rollers, the sides of said rollers being of uniform taper from end to end, their large ends being convexed and their small ends being conical; a thrust bearing ring on said inner bearing member for the large ends of said rollers, the bearing face of said thrust bearing ring being disposed so that the inner edges of said rollers contact therewith and other parts of the rollers are slightly separated therefrom; and a retaining ring into which the conical ends of said rollers project, the outer edge of said retaining ring being adapted to engage said rollers when the bearing members are separated, but being normally out of contact with the conical ends of said rollers, said thrust bearing ring being of sufficient width to coact with said retaining ring to retain said rollers on said inner bearing member when separated and while assembling.

15. In a bearing, the combination with an inner bearing cone; an outer bearing cone; conical rollers, the sides of said rollers being of uniform taper from end to end, their small ends being conical; a thrust bearing ring on said inner bearing cone for the large ends of said rollers, the bearing face of said thrust bearing ring being disposed so that it is engaged by the inner edges of said rollers and other parts of the rollers are slightly separated therefrom; and a retaining ring for said rollers into which the conical ends of said rollers project, said rollers being normally out of contact with said retaining ring, said thrust bearing ring being of sufficient width to coact with said retaining ring to retain the said rollers in said inner cone when the outer cone is removed.

16. In a bearing, the combination with an inner bearing cone; an outer bearing cone; conical rollers, the sides of said rollers being of uniform taper from end to end, their small ends being conical; a thrust bearing ring on said inner bearing cone for the large ends of said rollers; and a retaining ring for said rollers into which the conical ends of said rollers project, said rollers being normally out of contact with said retaining ring, said thrust bearing ring being of sufficient width to coact with said retaining ring to retain the said rollers in said inner cone when the outer cone is removed.

17. In a bearing, the combination with an inner bearing member; an outer bearing member; rollers, said rollers being convex at one end and conical at the other; a thrust bearing ring on said inner bearing member for the convex ends of said rollers, the bearing face of said thrust bearing ring being disposed so that it is engaged by the inner edges of said rollers and other parts of the rollers are slightly separated therefrom; and a retaining ring for said rollers into which the conical ends of said rollers project, said rollers being normally out of bearing contact with said retaining ring, said thrust bearing ring being of sufficient width to coact with said retaining ring to retain the said rollers in said inner member when the outer member is removed.

18. In a bearing, the combination with an inner bearing member; an outer bearing member; rollers, said rollers being convex at one end and conical at the other; a thrust bearing ring on said inner bearing member for the convex ends of said rollers; and a retaining ring for said rollers into which the conical ends of said rollers project, said rollers being normally out of bearing contact with said retaining ring, said thrust bearing ring being of sufficient width to coact with said retaining ring to retain the said rollers in said inner member when the outer member is removed.

19. In a bearing, the combination with an inner bearing member; an outer bearing member; conical rollers; a thrust bearing ring on said inner bearing member for the large ends of said rollers, the bearing face of said thrust bearing ring member being disposed so that the inner edges of said rollers contact therewith and other parts of the rollers are slightly separated therefrom; and a retaining ring for said rollers, into which their small ends project, said rollers being normally out of bearing contact with said retaining ring, said thrust bearing ring being of sufficient width to coact with said retaining ring to retain said rollers on said inner bearing member when the outer bearing member is removed.

20. In a bearing, an inner bearing member provided with an outwardly-projecting flange at its large end, said flange being shouldered on its inner side to provide an annular dust ring seat; an outer bearing member; a dust ring arranged in said seat, said dust ring being adapted to fit said outer bearing member; rollers; a thrust ring for said rollers sleeved upon said inner bearing member against the said flange thereon, said thrust ring being adapted to retain said dust ring on its said seat; a retaining ring for said rollers; and a locking ring for said retaining ring, said inner bearing member being provided with a groove to receive said locking ring.

21. In a bearing, an inner bearing member provided with an outwardly-projecting flange at its large end, said flange being shouldered on its inner side to provide an annular dust ring seat; an outer bearing member; a dust ring arranged in said seat, said dust ring being adapted to fit said outer bearing member; rollers; a thrust ring for said rollers sleeved upon said inner bearing member against the said flange thereon, said thrust ring being adapted to retain said dust ring on its said seat; and a retaining ring for said rollers.

In witness whereof, I have hereunto set my hand and seal in the presence of two witnesses.

HERBERT B. GILLETTE. [L. S.]

Witnesses:
JESSE N. ELLSWORTH,
CLYDE HERRINGTON.